Nov. 7, 1933.     A. B. REAVIS     1,934,609
REFRIGERATOR CONTROL
Original Filed July 6, 1932    2 Sheets-Sheet 1
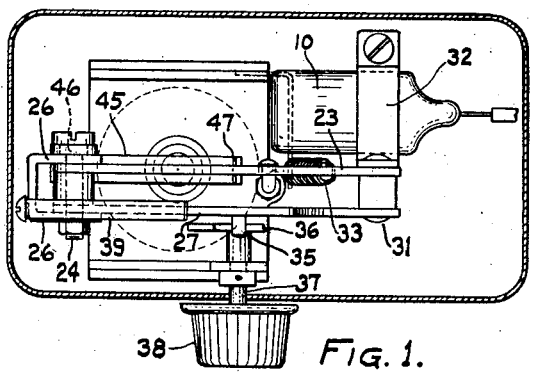
Fig. 1.
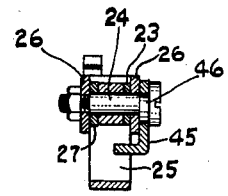
Fig. 5.
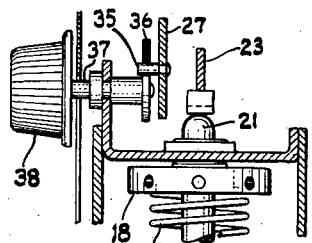
Fig. 6.
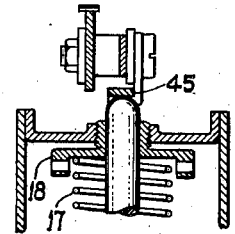
Fig. 7.
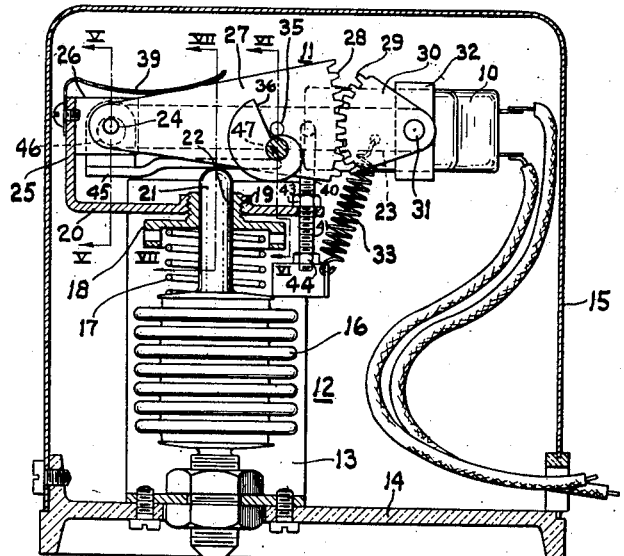
Fig. 2.
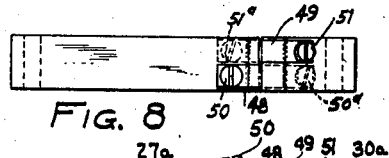
Fig. 8.
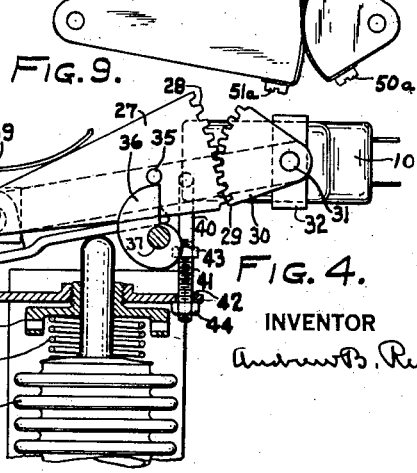
Fig. 9.
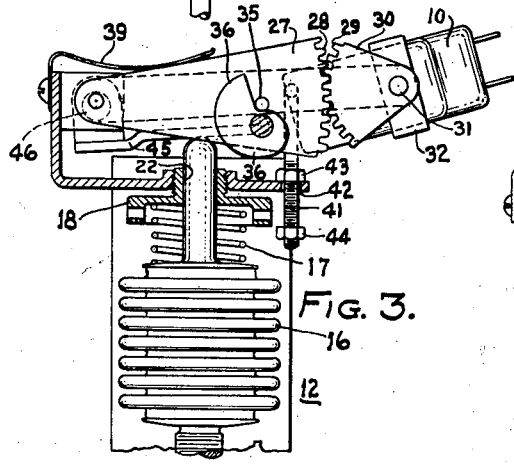
Fig. 3.
Fig. 4.
INVENTOR
Andrew B. Reavis Nov. 7, 1933.          A. B. REAVIS          1,934,609
REFRIGERATOR CONTROL
Original Filed July 6, 1932     2 Sheets-Sheet 2

WITNESS                                 INVENTOR

Patented Nov. 7, 1933

1,934,609

UNITED STATES PATENT OFFICE 1,934,609

REFRIGERATOR CONTROL

Andrew B. Reavis, Swarthmore, Pa., assignor to Westinghouse Electric & Manufacturing Company, East Pittsburgh, Pa., a corporation of Pennsylvania Application July 6, 1932, Serial No. 621,124
Renewed September 26, 1933

15 Claims. (Cl. 200—83)

My invention relates to mechanism for opening and closing an electric switch in response to changes in any suitable physical characteristic, for example, thermal and pressure changes, and it has for an object to provide apparatus of this character wherein the amplitude of opening and closing movement may be adjusted or shifted with respect to a member movable in response to the physical characteristic.

Switches used with electric refrigerators of the household type respond to temperature conditions obtaining in the cabinet to open and close the motor circuit so as to maintain a desired average temperature. It is customary to provide switches of this character with adjustments for lowering or raising the temperature to secure quick cooling or freezing or to obtain cycling of the refrigerator to maintain an average temperature at the evaporator above freezing in order to effect defrosting; and, in addition, it has been proposed to have other adjustments to secure continuous running and stoppage. In accordance with my invention, I provide a switch of this general character employing epicyclic transmission means between the member movable in response to temperature or pressure and the switch, the epicyclic transmission means being constructed and arranged to provide for adjustment or shifting of the amplitude of movement necessary to open and close the switch with respect to movement of the member movable in response to temperature or pressure change; and a more particular object of my invention is to provide a switch incorporating mechanism of this character providing for adjustment of the opening and closing amplitude.

More particularly, I provide sector gear and carrier members, one of which is held in a desired position and the other of which is moved by a member movable in response to temperature conditions, together with a sector pinion element operatively engaging the sector gear member and connected to the switch to open and close the latter. With this arrangement, the sector gear member or the carrier member is normally maintained stationary while angular movement imparted to the other member in response to temperature or pressure change results in movement of the sector pinion element to open and close the switch; and angular adjustment of the position either of the sector gear member or of the carrier member results in angular movement of the sector pinion element to advance or to retard the amplitude of switch opening and closing movement with respect to the position of the temperature or pressure responsive member. Therefore, a further object of my invention is to provide control mechanism of this character having means affording adjustment of the amplitude of switch opening and closing with respect to the range of movement of the temperature or pressure responsive member.

It is a further object of my invention to provide a switch, opened and closed in response to change of a physical characteristic, epicyclic means being employed to effect opening and closing of the switch in response to a change in the physical characteristic, together with manual means providing for advancing or retarding the amplitude of switch opening and closing movement and abutment means to prevent operation of the epicyclic means to close or to open the switch with predetermined adjustments of the advancing and retarding means.

These and other objects are effected by my invention as will be apparent from the following description and claims taken in connection with the accompanying drawings, forming a part of this application, in which:

Fig. 1 is a plan view of the switch with the cover remained;

Fig. 2 is a vertical sectional view of apparatus shown in Fig. 1;

Figs. 3 and 4 are detail views showing positions of the switch for different adjustments;

Figs. 5, 6, and 7 are sectional views taken along the lines V—V, VI—VI, and VII—VII, respectively of Fig. 2;

Figs. 8 and 9 are detail views showing modified forms of sectors; and

Figure 10:
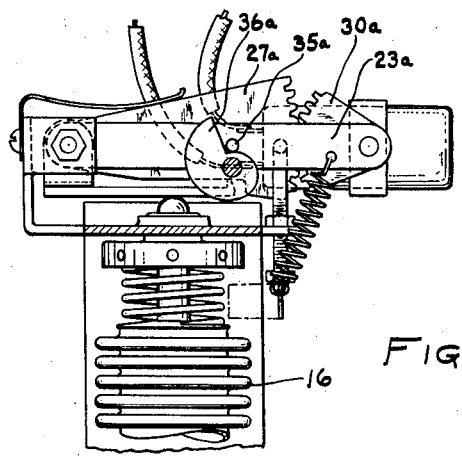
Figure 11:
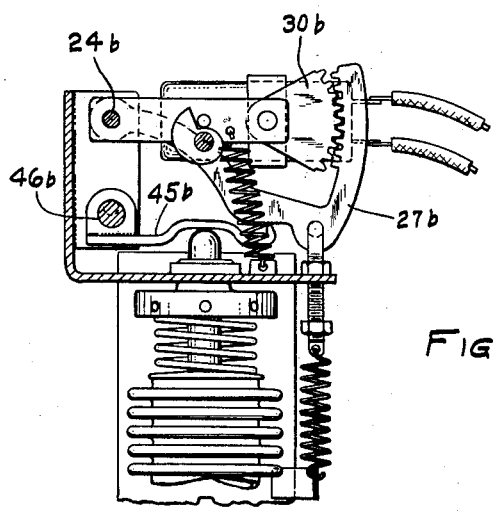

Figs. 10 and 11 show second, and third embodiments of my invention.

Referring to the drawings, more in detail, I show a switch 10 capable of being opened and closed by tilting movement, the switch being opened and closed by suitable mechanism, at 11, actuated by thermostatic means, at 12, these parts being carried or retained in place by a standard 13 connected to the base 14 and enclosed by a cover 15 secured to the base.

The switch 10 preferably being of the mercury type, is readily opened and closed by angular or tilting movement. The thermostatic apparatus, at 12, which opens and closes the switch 10 through the intermediary of the mechanism, at 11, includes an expansible and contractible element such as the sylphon or bellows 16 and a spring 17, the spring 17 opposing expansion of the bellows 16 in a well-known manner.

The spring force opposing the bellows may be varied by adjustment of the follower or abutment 18 engaging the upper end of the spring and threaded at 19 to the cross bar 20 of the standard.

The thermostat, at 12, includes a stem 21 extending upwardly through the guide opening 22 provided in the follower 18 and engaging the mechanism, at 11, to tilt the switch 10 to open and close the latter. The mechanism, at 11, is of the planetary or epicyclic type and it includes a lever or carrier 23 pivoted on the pin 24 carried by the standard 13, the cross bar 20 of the standard having a vertical extension 25 formed with supporting ears 26 for the pin. A normally stationary and adjustable sector 27 is pivoted to the pin 24; and, as shown in Figs. 1, 2, 3, and 4, has gear teeth 28 meshing with teeth 29 provided on the sector 30, the latter sector being connected to the stub shaft 31 journalled on the outer end of the lever 23 and having connected thereto the cradle 32 for the switch 10.

The lever or carrier 23 is moved upwardly against the force of suitable biasing means, for example, the spring 33 when the bellows 16 expands; and, when the bellows contracts, the spring 33 moves the carrier in the opposite direction. The movement of the carrier or lever 23 angularly about the pin 24 causes the sector 30 to roll on the normally stationary sector 27, thereby giving angular movement to the stub shaft 31 to open and close the switch. As illustrated, the switch is opened when in horizontal position (Figs. 2 and 4) and closed when tilted in a counter-clockwise direction from horizontal (Fig. 3).

Variation of the amplitude of opening and closing movement of the switch with respect to the range of movement of the thermostat, at 12, is secured by angular adjustment of the normally stationary sector 27. To this end, I show the sector 27 provided with an abutment pin 35 engaging the periphery of the cam 36 carried by a shaft 37 extending outwardly through the cover 15 and provided with an actuating knob 38. The standard, at 12, is provided with a spring 39 engaging the sector 27 to maintain the pin 35 in engagement with the cam 36, whereby the position of the sector 27 is determined by the cam and the spring. If the normally stationary sector 27 is adjusted angularly, due to turning of the cam 36, it will be apparent that the sector 30, and the switch 10 will be moved angularly. It will, therefore, be apparent that the cam adjustment makes it possible to vary the amplitude of switch opening and closing movement with respect to the range of thermostat movement, that is, the purpose of this adjustment is to raise or to lower the temperature at which the thermostat is effective to open and close the switch.

Assuming that the control mechanism is utilized to control cycling of a mechanical refrigerator, if the sector 27 is adjusted clockwise, the sector 30 will be moved angularly in a counter-clockwise direction, thereby lowering the temperatures at which the switch 10 is opened and closed, the minimum temperatures for which are when the pin 35 engages the cam portion of minimum radius, this position being shown in Fig. 2. The opening and closing temperatures may be raised from the lowest, or quick-freezing, position shown in Fig. 2 by rotating the cam 35 so as to bring portions of increasing radius into cooperation with the pin 35; and the cam may have such a design, as illustrated, that the opening and closing temperatures may occur sufficiently high to secure defrosting with maintenance of cycling, whereby danger of food spoilage is avoided. The "defrost" position is preferably provided for by a cam portion of somewhat less than maximum radius, the maximum radius portion of the cam being reserved for the "off" condition as hereinafter pointed out.

With the control apparatus applied to a refrigerator, adjustment means is associated with the mechanism 11, to provide for continuous operation or to interrupt operation completely. For example, I show the carrier or lever 23 provided with a depending rod 40 having a threaded portion 41 passing through an opening 42 provided in the cross member 20. Upper and lower abutment nuts 43 and 44 are carried by the threaded stem 41, the upper nut 43 limiting clockwise movement of the lever or carrier 23 and the lower nut limiting counter-clockwise movement thereof. The nut 43 is shown in Fig. 2 screwed upwardly so that the control apparatus is operative to provide for cycling at the minimum switch opening and closing temperatures. If the nut 43 is screwed downwardly, to a sufficient extent, as shown in Fig. 3, it will limit clockwise movement of the carrier or lever 23 and prevent opening of the switch. With suitable adjustment of the lower abutment nut 44, as shown in Fig. 4, the counter-clockwise movement of the carrier or lever 23 may be so limited as to prevent counter-clockwise movement of the sector 30 and the switch 10 sufficient to close the latter, whereby operation of the refrigerator is completely interrupted. Therefore, the position of the cam shown in Fig. 4 is the "off" position.

The follower 18 may be adjusted to secure opening and closing of the switch 10 approximately at temperatures or pressures desired; however, to secure finer adjustment, I provide means for modifying the angular motion of the carrier or lever 23 relative to reciprocatory motion of the stem 21. To this end, the stem 21 does not bear directly against the underside of the carrier 23 but against a lever 45 engaging the eccentric 46 on the pivot pin 24 and having an outer abutment or knife-edge portion 47 engaging the lower side of the carrier or lever 23, the stem 21 engaging the lower side of the lever 45. By adjusting the pin 24 angularly, the axis of the lever 45 may be adjusted in or out with respect to the axis of the carrier or lever 23, with the result that angular motion of the latter may be modified for a given motion of the stem 21.

If desired, instead of toothed sectors 27 and 30, I may use sectors 27a and 30a connected by flexible strips 48 and 49, the upper end of the strip 48 being secured by a screw 50 to the upper side of the sector 27a and by a screw 50a to the lower side of the sector 30a and the strip 49 being secured to the upper side of the sector 30a by a screw 51 and to the lower side of the sector 27a by a screw 51a, the strips engaging the curved surfaces of the sectors. The modified form of transmission minimizes looseness or backlash.

Fig. 10 shows a second embodiment of my invention similar to that already described except the bellows 16 actuates the main section 27a and the adjustment cam 36a engages the pin 35a to adjust the angular position of the lever 23a. It will be apparent that angular adjustment of the lever 23a results in the sector 30a rolling on the sector 27a to advance or to retard the amplitude of switch opening and closing movement relative to the thermostat range of movement.

Fig. 11 shows a third embodiment of my invention wherein the sector 27b is of the internal type so that the sector 30b may be disposed in overlapping relation to limit the dimensions of the apparatus. Vernier adjustments are secured in a manner similar to the first embodiment except that the lever 45b is adjusted by an eccentric 46b which is not coaxial with the pivot pin 24b.

While I have referred to application of the control mechanism to a refrigerator to make the operation and utility thereof clear, it is to be understood that it may be used in any suitable situation where it is desired to advance or retard the amplitude of switch opening and closing movement with respect to a predetermined range of movement of a control element.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a control mechanism, an electric switch; a tiltable element for opening and closing the switch; a movable control element; and epicyclic means for transmitting motion from the control element to the tiltable element including a first sector member, a carrier member, means for holding one of said members in a predetermined position and the other of said members being operated by the control element, and a second sector member carried by the carrier member and operatively connected to the first sector member and to the tiltable element.

2. In a control mechanism, an electric switch; a tiltable element for opening and closing the switch; a movable control element; and epicyclic means for transmitting motion from the control element to the tiltable element including a first sector member, a carrier member, means for holding one of said members in a predetermined position and the other of said members being operated by the control element, a second sector member carried by the carrier member, and operatively connected to the first sector member and to the tiltable element, and means providing a supporting axis for the first sector and carrier members.

3. In a control mechanism, an electric switch; a tiltable element for opening and closing the switch; a movable control element; and epicyclic means for transmitting motion from the control element to the tiltable element including a first sector member, a carrier member, means for angularly adjusting one of said members to a desired position and for holding the latter in said position and the other of said members being operated by the control element, and a second sector member carried by the carrier member and operatively connected to the first sector member and to the tiltable element.

4. In a control mechanism, an electric switch; a tiltable element for opening and closing the switch; a movable control element; epicyclic means for transmitting motion from the control element to the tiltable element including a first sector member, a carrier member, means for angularly adjusting one of said members to a desired position and for holding the latter in said position and the other of said members being operated by the control element, and a second sector member carried by the carrier member and operatively connected to the first sector member and to the tiltable element; and means for limiting motion of the member actuated by the control element, with a predetermined angular adjustment of the other member, to prevent closure of the switch.

5. In a control mechanism, an electric switch; a tiltable element for opening and closing the switch; a movable control element; epicyclic means for transmitting motion from the control element to the tiltable element including a first sector member, a carrier member, means for angularly adjusting one of said members to a desired position and for holding the latter in said position and the other of said members being operated by the control element, and a second sector member carried by the carrier member and operatively connected to the first sector member and to the tiltable element; and means for limiting motion of the actuated member, with a predetermined adjustment of the other member, to prevent opening of the switch.

6. In a control mechanism, an electric switch; a tiltable element for opening and closing the switch; a movable control element; epicyclic means for transmitting motion from the control element to the tiltable element including a first sector member, a carrier member, means for holding one of said members in a predetermined position and the other of said members being operated by the control element; and a second sector member carried by the carrier member and operatively connected to the first sector member and to the tiltable element; and means for adjusting the ratio of movement of the actuated member relative to movement of the control element.

7. In a control mechanism, an electric switch; a tiltable element for opening and closing the switch; a movable control element; and epicyclic means for transmitting motion from the control element to the tiltable element including a first sector member, a carrier member, means for angularly adjusting one of said members including means for biasing the latter for movement in one direction and a manually-operated cam for moving it in the other direction against the force of the biasing means and the other of said members being operated by said control element, and a second sector member carried by the carrier member and operatively connected to the first sector member and to the tiltable element.

8. In a control mechanism, an electric switch; a tiltable element for opening and closing the switch; a movable control element; epicyclic means for transmitting motion from the control element to the tiltable element including a first sector member, a carrier member, means for angularly adjusting one of said members and the other of said members being operated by the control element, and a second sector member carried by the carrier member and operatively connected to the first sector member and to the tiltable element; and abutment means for limiting motion of the member moved by the control element and which is effective, with a predetermined setting of said adjusting means, to limit movement of the member to prevent closing of the switch.

9. In a control mechanism, an electric switch; a tiltable element for opening and closing the switch; a movable control element; epicyclic means for transmitting motion from the control element to the tiltable element including a first sector member, a carrier member, means for holding one of said members in a predetermined position and the other of said members being operated by the control element, and a second sector member carried by the carrier member and operatively connected to the first sector member and to the tiltable element; and means for adjusting the movement of the actuated members relative to movement of the control element including a lever engaged by the control element, having one end engaging the actuated member, and having its other end mounted on an adjustable eccentric.

10. In a control mechanism, an electric switch; a tiltable element for opening and closing the switch; a movable control element; and epicyclic means for transmitting motion from the control element to the tiltable element including a sector gear member having internal teeth; a carrier member; means providing a common pivotal axis for the sector gear and carrier member; means for holding one of said members in a predetermined position and the other of said members being operated by the control element; and a sector pinion having teeth meshing with the sector gear member teeth, carried by the carrier member, and operatively connected to the tiltable element.

11. In a control mechanism, an electric switch; a tiltable element for opening and closing the switch; an element movable through a predetermined range in response to change of a physical characteristic; epicyclic means for transmitting motion from the control element to the tiltable element including a sector gear member; a carrier member; one of said members being operated by the control element; and a sector pinion operated by the sector gear member, carried by the carrier member, and operatively connected to the tiltable member; and manual means for adjusting the angular position of one of said members in order to effect opening and closing of the switch at desired points along said range.

12. In a control mechanism, an electric switch; a tiltable member for opening and closing the switch; a member movable in response to temperature change; and epicyclic means for transmitting motion from the temperature responsive member to the tilting member including a normally fixed sun gear element, a planet pinion element operatively connected to the sun gear element and to the tiltable member, and a carrier pivotally supporting the planet pinion element and the tiltable member and movable by said temperature responsive member.

13. The combination as claimed in claim 12 with means for angularly adjusting the position of the sun gear element in order to advance or retard the tiltable member with respect to the temperature responsive member so as to raise and lower the temperatures at which the switch is opened and closed.

14. The combination as claimed in claim 12 with means for angularly adjusting the sun gear element including means biasing the latter for movement in one direction and a manually operated cam for moving the gear element in the other direction against the force of the biasing means.

15. In a control mechanism, an electric switch; a tiltable member for opening and closing the switch; a member movable in response to temperature change through a predetermined temperature range; epicyclic means for transmitting motion from the temperature responsive member to the tilting member including a sun gear element, a planet pinion element engaging the sun gear element and connected to the tiltable member, and a carrier pivotally supporting the planet pinion element and the tiltable member and moved by the temperature responsive member; and manual means for adjusting the angular position of the sun gear element in order to effect opening and closing of the switch at desired points along said temperature range.

ANDREW B. REAVIS.